(12) United States Patent
Kuniba et al.

(10) Patent No.: US 6,990,243 B1
(45) Date of Patent: Jan. 24, 2006

(54) ELECTRONIC CAMERA AND IMAGE PROCESSING PROGRAM

(75) Inventors: Hideyasu Kuniba, Shinagawa-ku (JP); Sadami Okada, Sakado (JP); Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 849 days.

(21) Appl. No.: 10/018,468

(22) PCT Filed: Aug. 15, 2000

(86) PCT No.: PCT/JP00/05468

§ 371 (c)(1),
(2), (4) Date: Dec. 19, 2001

(87) PCT Pub. No.: WO01/13627

PCT Pub. Date: Feb. 22, 2001

(30) Foreign Application Priority Data

Aug. 17, 1999 (JP) .................................. 11-230593

(51) Int. Cl.
*G06K 9/36* (2006.01)

(52) U.S. Cl. .................................. 382/239; 382/251

(58) Field of Classification Search ........ 382/239–240, 382/232–235, 244–248, 250–251, 254, 275, 382/268–269, 166, 236, 243; 348/207.99, 348/222.1; 375/240.01–240.03, 240.18–240.25; 358/426.01–426.16
See application file for complete search history.

(56) References Cited

U.S. PATENT DOCUMENTS

| 5,045,925 | A   |   | 9/1991  | Saito ..................... 375/240.01 |
| 5,410,352 | A   | * | 4/1995  | Watanabe ............... 375/240.03 |
| 5,724,452 | A   | * | 3/1998  | Ohara ........................ 382/251 |
| 5,838,817 | A   | * | 11/1998 | Funada ....................... 382/166 |
| 6,222,943 | B1  | * | 4/2001  | Suga .......................... 382/239 |
| 6,351,570 | B1  | * | 2/2002  | Kobayashi ................. 382/250 |
| 6,697,529 | B2  | * | 2/2004  | Kuniba ....................... 382/239 |
| 6,876,770 | B2  | * | 4/2005  | Kuniba ....................... 382/239 |
| 6,891,975 | B2  | * | 5/2005  | Okada ........................ 382/243 |

FOREIGN PATENT DOCUMENTS

| JP | A 2-105686 | 4/1990 |
| JP | A 2-222394 | 9/1990 |
| JP | A 4-362876 | 12/1992 |
| JP | A 6-54295  | 2/1994 |
| JP | 09247675   | * 9/1997 |
| JP | A 9-247675 | 9/1997 |
| JP | 09261636   | * 10/1997 |
| JP | 09284767   | * 10/1997 |
| JP | A 9-261636 | 10/1997 |
| JP | A 9-284767 | 10/1997 |

* cited by examiner

*Primary Examiner*—Joseph Mancuso
*Assistant Examiner*—Ishrat Sherali
(74) *Attorney, Agent, or Firm*—Oliff & Berridge PLC

(57) ABSTRACT

As the target compression rate is set higher, the ratio of a DC component quantization step and an AC component quantization step (referred to as a "DC/AC quantization ratio" is adjusted to a smaller value and then a compression size adjustment is implemented while sustaining the DC/AC quantization ratio at a substantially constant value. In addition, if the compression rate is set higher than a predetermined factor, the DC/AC quantization ratio is fixed at a constant value regardless of the target compression rate setting to prevent the DC component quantization step from becoming excessively small.

4 Claims, 6 Drawing Sheets

FIG.4A

REFERENCE QUANTIZATION TABLES FOR 1/4 COMPRESSION

DC COMPONENT REFERENCE QUANTIZATION STEP

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

REFERENCE QUANTIZATION TABLE FOR BRIGHTNESS

FIG.4B

DC COMPONENT REFERENCE QUANTIZATION STEP

| 17 | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

REFERENCE QUANTIZATION TABLE FOR COLOR DIFFERENCES

FIG.5A

REFERENCE QUANTIZATION TABLES FOR 1/8 AND 1/16 COMPRESSION

DC COMPONENT REFERENCE QUANTIZATION STEP

| 8 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

REFERENCE QUANTIZATION TABLE FOR BRIGHTNESS

FIG.5B

DC COMPONENT REFERENCE QUANTIZATION STEP

| 8 | 18 | 24 | 47 | 99 | 99 | 99 | 99 |
|---|---|---|---|---|---|---|---|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

REFERENCE QUANTIZATION TABLE FOR COLOR DIFFERENCES

FIG.6A

PRIOR ART

DC COMPONENT REFERENCE QUANTIZATION STEP

| 16 | 11 | 10 | 16 | 24 | 40 | 51 | 61 |
|----|----|----|----|----|-----|-----|-----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

REFERENCE QUANTIZATION TABLE FOR BRIGHTNESS

FIG.6B

DC COMPONENT REFERENCE QUANTIZATION STEP

| 17 | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

REFERENCE QUANTIZATION TABLE FOR COLOR DIFFERENCES

ELECTRONIC CAMERA AND IMAGE PROCESSING PROGRAM

The disclosures of the following priority application is herein incorporated by reference:
Japanese Patent Application No. H 11-230593 filed Aug. 17, 1999

TECHNICAL FIELD

The present invention relates to an electronic camera and an image processing program having an image compression function.

BACKGROUND ART

Image data handled in an electronic camera or a computer normally undergo image compression (e.g., JPEG compression) processing, in order to efficiently record the image data at a recording medium. The image compression processing may be executed through, for instance, the following steps 1~6.

1. The electronic camera determines a target image data compression rate in correspondence to the compressed image quality setting selected by the photographer (e.g., by switching to one of; FINE/NORMAL/BASIC).

2. The electronic camera divides the image data constituted of the brightness Y and the color differences Cb, Cr blocks each made up of, for instance, 8×8 pixels. The electronic camera then implements DCT (discrete cosine transform) in units of the individual blocks resulting from the division and obtains transformation coefficients each corresponding to one of 8×8 discrete spatial frequencies.

3. The electronic camera prepares reference quantization tables defining a quantization step in correspondence to each of the 8×8 transformation coefficients. By multiplying the data in the reference quantization tables by a scale factor SF (a type of compression parameter), the electronic camera obtains a quantization table to be utilized in actual processing.

4. The electronic camera quantizes each of 8×8 transformation coefficients using the quantization tables obtained in step 3.

5. The electronic camera compresses the quantized data by coding the data through variable length coding, run-length coding or the like.

6. If the compression size deviates from the allowable target compression rate range, the electronic camera first readjusts the value of the scale factor SF and then re-engages in the operation in step 3 above. If, on the other hand, the compression size is within the allowable target compression rate range, it ends the image compression processing.

Through the processing described above, the image data can be compressed at a compression rate within the allowable target compression rate range.

Under normal circumstances, when compressing image data with a large information volume in an electronic camera, the scale factor SF is set to a relatively high value in order to assure that the compression size is kept within the target compression rate range. When the scale factor SF increases, the step taken to quantize the DC component becomes larger and, as a result, significant quantization noise manifests in the quantized DC component. Such quantization noise in the DC component then manifests as pronounced block noise in the decompressed image.

For instance, when handling data of an image of sunlight filtering through leaves, significant block noise manifests over a flat area such as a tree trunk while no significant block noise manifests over details such as tree leaves and the like.

Block noise resulting from the compression size adjustment may be prevented by implementing a fixed DC component quantization step which does not change regardless of the setting for the scale factor SF. In this case, since the DC component quantization step is fixed, there is no concern that block noise may result from the compression size adjustment.

However, these measures frequently lead to an undesirable phenomenon on the opposite extreme in that if the scale factor SF is set to a relatively small value to process image data with a small information volume, the AC component quantization step becomes smaller than the DC component quantization step. When such a reverse phenomenon occurs, the compression distribution of the DC component/AC component becomes poor and the priority of compression is not given to information which is visually important.

The block noise mentioned above may be prevented by individually adjusting the DC component quantization step and the AC component quantization step. By implementing the individual adjustments, it becomes possible to fully take into consideration all the important factors including the block noise, the compression size and the compression distribution.

However, a greater number of parameters must be adjusted during the compression size adjustment if the individual adjustments mentioned above are implemented. In addition, the effects of the individual parameters on the compression size and the compressed image quality are complex and indeterminate. For this reason, it is difficult to execute the correct compression processing by individually adjusting these parameters during the compression size adjustment. Furthermore, there is another problem in that since the number of options for each parameter increases, the compression size adjustment cannot be completed quickly.

DISCLOSURE OF THE INVENTION

An object of the present invention is to provide an electronic camera capable of reliably minimizing the occurrence of block noise, sustaining a correct compression distribution of the DC component/AC component and executing the compression size adjustment with ease and reliability.

Another object of the present invention is to provide an image processing program for implementing image compression processing that makes it possible to reliably minimize the occurrence of block noise, maintain a correct compression distribution of the DC component/AC component and execute compression size adjustment with ease and reliability.

In order to achieve the objects described above, the electronic camera according to the present invention comprises an image-capturing element that captures an image of a subject and outputs image data of the captured subject image and a compression processing unit that compresses the image data by converting the image data to a spatial frequency DC component and a spatial frequency AC component and by quantizing and coding the two components. The compression processing unit includes a quantization ratio determining processing unit that determines the ratio of a DC component quantization step and an AC component quantization step (DC/AC quantization ratio) in correspondence to a target compression rate, a quantization adjustment processing unit that makes an adjustment on the DC component quantization step and the AC component quantization step while sustaining the DC/AC quantization ratio at a substantially constant value and a compression rate control processing unit that controls the quantization adjustment processing unit so that a compression code volume resulting from the compression can be within a range according to a target compression rate.

Since the DC/AC quantization ratio is determined in correspondence to the target compression rate, the DC/AC quantization ratio can be set so as to ensure that no block noise will manifest in a situation in which block noise would occur if the constant DC/AC quantization ratio remained unchanged at all times, for instance. In addition, since the DC component quantization step and the AC component quantization step are adjusted while sustaining the DC/AC quantization ratio at a substantially constant value, the processing is simplified compared to processing achieved by individually adjusting the DC component quantization step and the AC component quantization step and furthermore, the compression code volume can be adjusted while maintaining good balance in the compression distribution of the DC component and the AC component.

The DC/AC quantization ratio can be adjusted to a smaller value by the quantization ratio determining processing unit as the target compression rate is set for higher compression.

Moreover, the quantization ratio determining processing unit may fix the DC/AC quantization ratio at a constant value regardless of the target compression rate setting when the target compression rate is higher than a predetermined value.

The program according to the present invention implements DCT processing in which image data are converted to a spatial frequency DC component and a spatial frequency AC component, quantization ratio determining processing in which the ratio of a DC component quantization step and an AC component quantization step (DC/AC quantization ratio) is determined in correspondence to a target compression rate, quantization adjustment processing in which the DC component quantization step and the AC component quantization step are adjusted while sustaining the DC/AC quantization ratio at a substantially constant value and compression rate control processing in which control is implemented on the quantization adjustment processing so that a compression code volume resulting from the compression can be within a range according to a target compression rate range. Through the program, the image data are compressed by quantizing and coding the DC component and the AC component. This image processing program may be stored in a recording medium which can be read by a computer or may be transmitted via a communication line such as the Internet.

BRIEF DESCRIPTION OF THE DRAWINGS

FIG. 4A shows the reference quantization table for the brightness Y corresponding to a target compression rate of ¼;

FIG. 4B shows the reference quantization table for the color differences Cb and Cr corresponding to a target compression rate of ¼;

FIG. 5A shows the reference quantization table for the brightness Y corresponding to target compression rates of ⅛ and 1/16;

FIG. 5B shows the reference quantization table for the color differences Cb and Cr corresponding to target compression rates of ⅛ and 1/16; and FIGS. 6A and 6B show reference quantization tables used in the prior art.

BEST MODE FOR CARRYING OUT THE INVENTION

An embodiment of the present invention is now explained in reference to the drawings.

Figure 1:
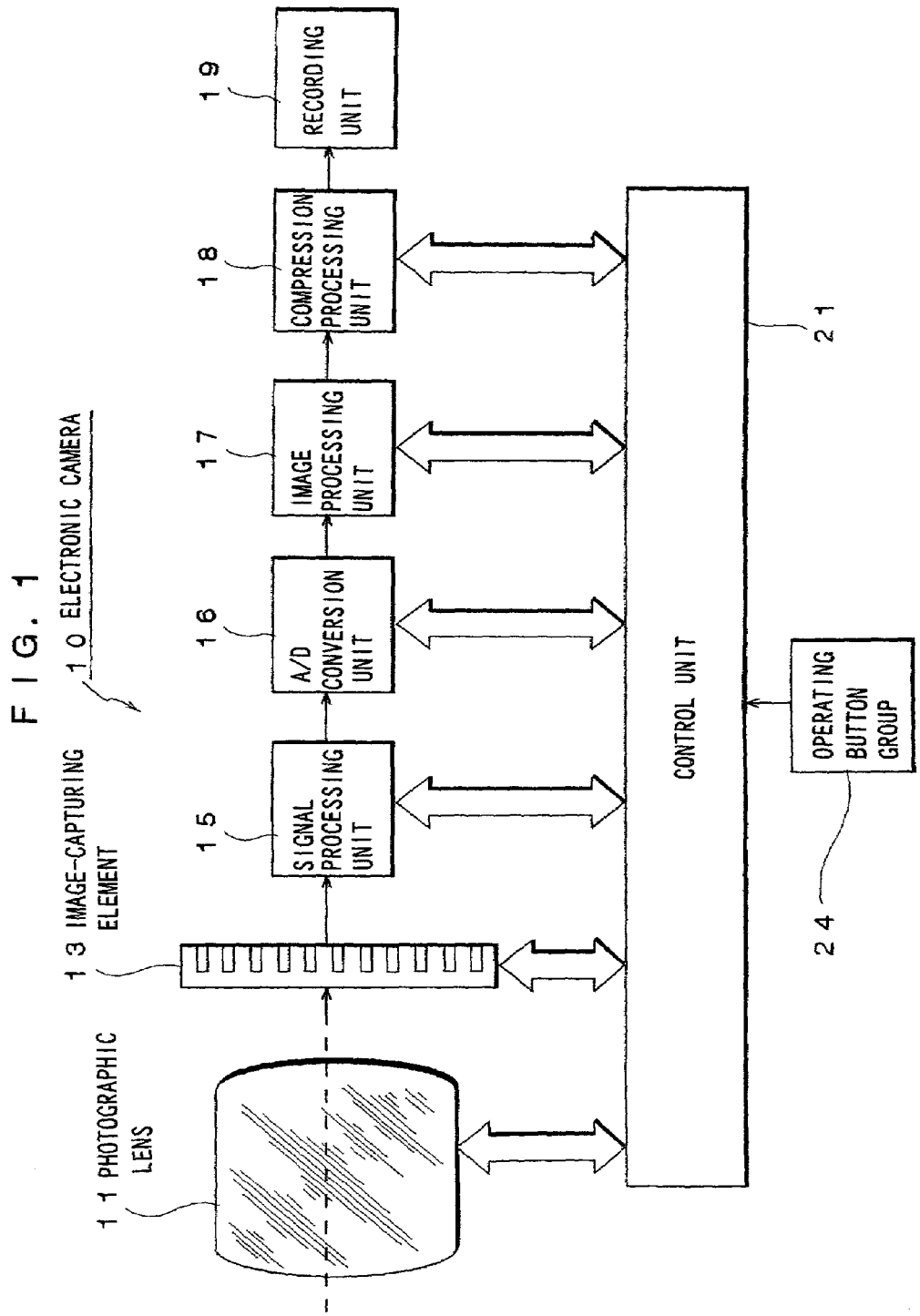
FIG. 1 is a schematic block diagram illustrating the structure adopted in the electronic camera.

FIG. 1 is a schematic block diagram illustrating the structure of an electronic camera 10. The electronic camera 10 in FIG. 1 is mounted with a photographic lens 11. An image-capturing element 13 is provided in the image space of the photographic lens 11. Image data generated at the image-capturing element 13 sequentially undergo specific types of processing at a signal processing unit 15, an A/D conversion unit 16 and an image processing unit 17, and then are input to a compression processing unit 18 as digital image data. The compression processing unit 18 performs JPEG compression on the input image data and outputs compressed data to a recording unit 19. The recording unit 19 records the input compressed image data to a recording medium (not shown) which may be a memory card.

In addition, the electronic camera 10 is provided with a control unit 21 for implementing system control, an operating button group 24 through which camera operations are performed and the compressed image quantity is set, and the like.

Figure 2:
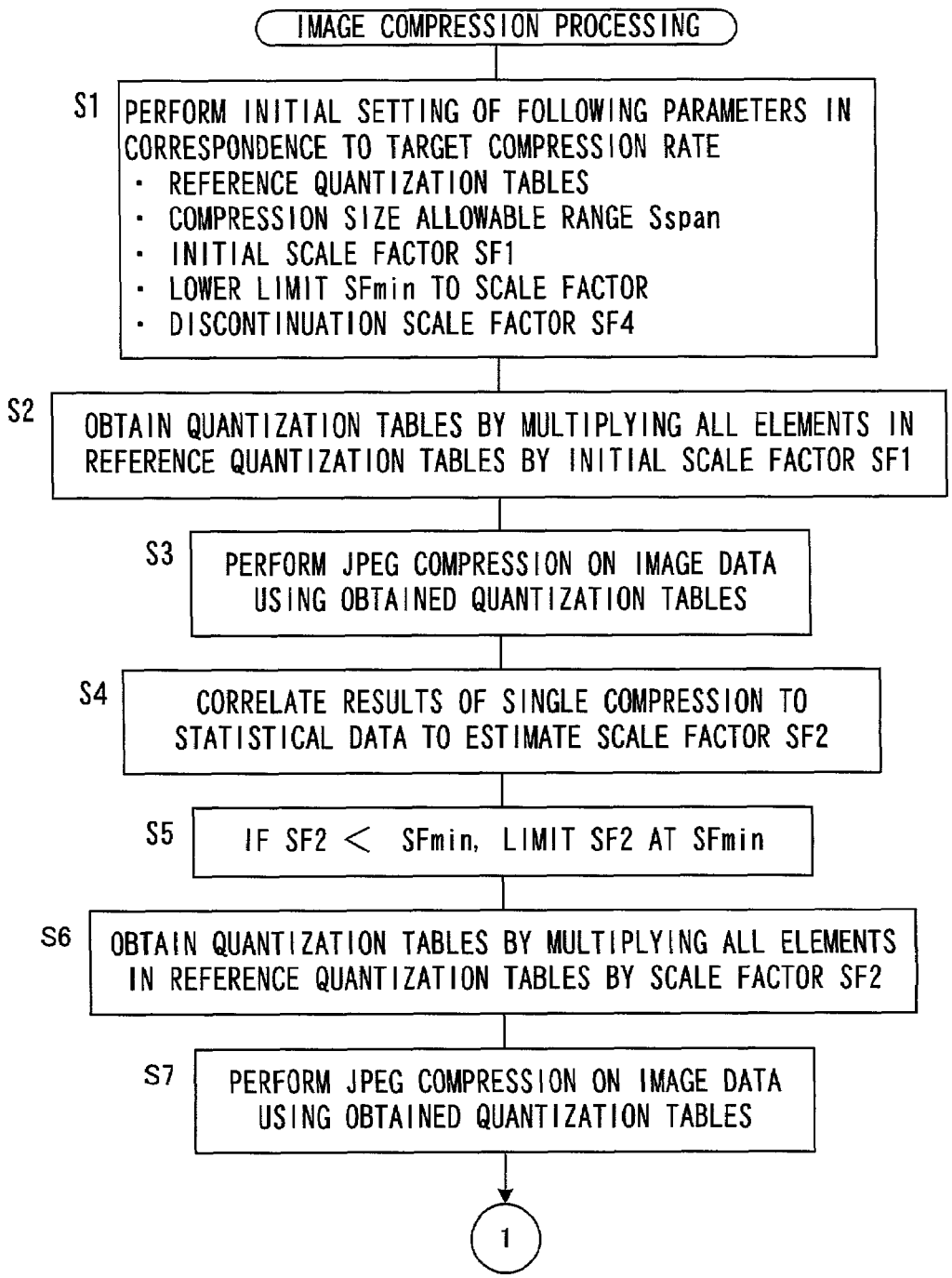
FIG. 2 is a flowchart of the first half of the image compression processing implemented at the compression processing unit.
Figure 3:
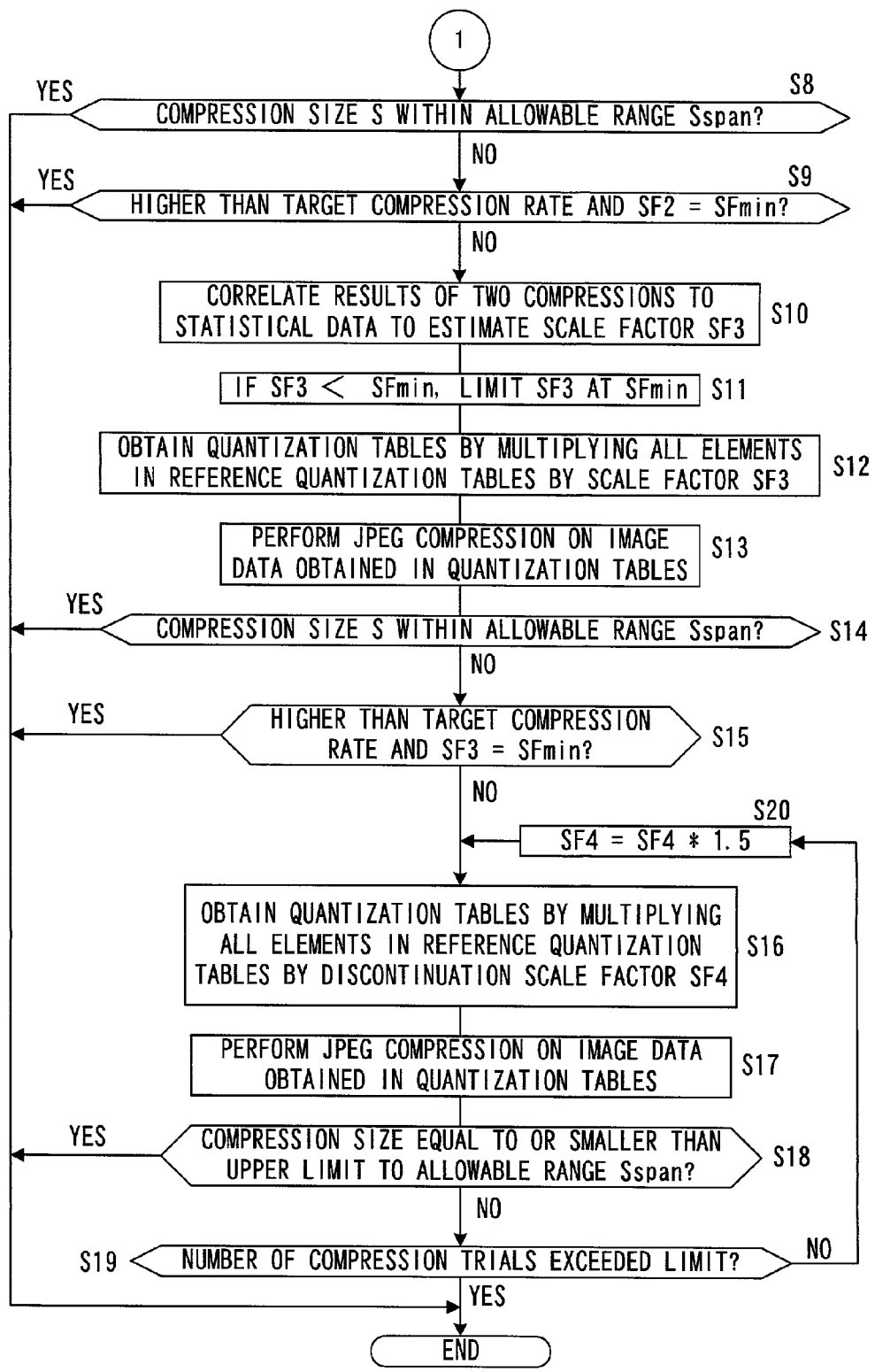
FIG. 3 is a flowchart of the second half of the image compression processing implemented at the compression processing unit.

FIGS. 2 and 3 present a flowchart of the image compression processing implemented at the compression processing unit 18. The following is an explanation of the image compression processing which characterizes the present invention, given in reference to FIGS. 2 and 3. In step S1 in FIG. 2, the compression processing unit 18 ascertains the compressed image quality setting (FINE, NORMAL, BASIC or the like in this example) selected at the operating button group 24 by engaging in communication with a control unit 21. The compression processing unit 18 determines a target compression rate (¼ compression, ⅛ compression, 1/16 compression in this example) in correspondence to the image quality setting that has been ascertained. The compression processing unit 18 then performs initial setting for the following parameters in correspondence to the target compression rate thus determined. It is to be noted that the code volume resulting from the image compression, i.e., the compressed data size, is to be referred to simply as the compression size.

Reference (or standard) quantization tables
Allowable compression size range Sspan
Initial scale factor SF1
Scale factor lower limit SFmin
Discontinuation scale factor SF4

FIG. 4A shows the reference quantization table for the brightness Y at a target compression rate ¼. FIG. 4B shows the reference quantization table for the color differences (or chrominances) Cb and Cr at the target compression rate ¼.

FIG. 5A shows the reference quantization table for the color differences Cb and Cr at target compression rates 1/8 and 1/16. FIG. 5B shows the reference quantization table for the color differences Cb and Cr at the target compression rates 1/8 and 1/16. In these reference quantization tables, the numerical value in the upper left corner, i.e., the DC component reference quantization step, is adjusted in correspondence to the target compression rate.

The remaining 63 numerical values excluding the numerical value in the upper left corner in each reference quantization table represent the data used in the AC component reference quantization step determined in correspondence to one of the transformation coefficients resulting from the DCT processing. A DC/AC quantization ratio is calculated by dividing the DC component reference quantization step by the AC component reference quantization step in each table.

In step S2 in FIG. 2, the compression processing unit 18 prepares quantization tables for test compression by multiplying all the elements in the reference quantization tables set in step S1 by the initial scale factor SF1.

In step S3, the compression processing unit 18 implements JPEG compression on the image data by using the quantization tables for test compression.

In step S4, the compression processing unit 18 correlates the results of the test compression to statistical data having been stored in advance in the memory provided within the compression processing unit 18 to estimate a correct scale factor SF2 for achieving the target compression rate.

In step S5 the compression processing unit 18 sets a limit to the estimated scale factor SF2 with the lower limit SFmin.

In step S6, the compression processing unit 18 prepares quantization tables by multiplying all the elements in the reference quantization tables selected in step S1 by the scale factor SF2.

In step S7, the compression processing unit 18 implements JPEG compression on the image data using the quantization tables thus prepared.

In step S8 in FIG. 3, the compression processing unit 18 makes a decision as to whether or not the compression size S is within the allowable range Sspan. If the compression size S is outside the allowable range Sspan and thus a negative decision is made, the compression processing unit 18 proceeds to step S9. If, on the other hand, an affirmative decision is made that the compression size S is within the allowable range Sspan, the compression processing unit 18 judges that the desired image compression has been completed and ends the image compression processing in FIG. 3.

In step S9, the compression processing unit 18 makes a decision as to whether or not conditions "the current compression rate is higher than the target compression rate" and "the scale factor SF2 is equal to the lower limit SFmin" are both satisfied. If the conditions are both satisfied, it can be assumed that the compression target image data are a special type of image data with an extremely small information volume. Accordingly, the compression processing unit 18 discontinues or truncates the image compression if an affirmative decision is made in step S9 and ends the image compression processing in FIG. 3. In this case, the image compression has been executed by using the lower limit SFmin. If, on the other hand, negative decision is made in step S9, the compression processing unit 18 proceeds to step S10.

In step S10, the compression processing unit 18 correlates the results of the two compressions to the statistical data having been stored in advance in the memory provided within the compression processing unit 18 to estimate a correct scale factor SF3 for achieving the target compression rate.

In step S11, the compression processing unit 18 sets a limit to the estimated scale factor SF3 with the lower limit SFmin.

In step S12, the compression processing unit 18 prepares quantization tables by multiplying all the elements in the reference quantization tables selected in step S1 by the scale factor SF3.

In step S13, the compression processing unit 18 implements JPEG compression on the image data using the quantization tables thus prepared.

In step S14, the compression processing unit 18 makes a decision as to whether or not the compression size S is within the allowable range Sspan. If the compression size S is outside the allowable range Sspan and thus a negative decision is made, the compression processing unit 18 proceeds to step S15 If, on the other hand, an affirmative decision is made that the compression size S is within the allowable range Sspan, the compression processing unit 18 judges that the desired image compression has been completed and ends the image compression processing in FIG. 3.

In step S15, the compression processing unit 18 makes a decision as to whether or not conditions "the current compression rate is higher than the target compression rate" and "the scale factor SF3 is equal to the lower limit SFmin" are both satisfied. If the conditions are both satisfied, it can be assumed that the compression target image data are a special type of image data with an extremely small information volume. Accordingly, the compression processing unit 18 discontinues the image compression if an affirmative decision is made in step S15 and ends the image compression processing in FIG. 3. In this case, the image compression has been executed by using the quantization tables. If, on the other hand, a negative decision is made in step S15, the compression processing unit 18 proceeds to step S16.

In step S16, the compression processing unit 18 prepares quantization tables by multiplying all the elements in the reference quantization tables selected in step S1 by the discontinuation scale factor SF4.

In step S17, the compression processing unit 18 implements JPEG compression on the image data using the quantization tables thus prepared.

In step S18, the compression processing unit 18 makes a decision as to whether or not the compression size S is equal to or smaller than (the upper limit to the allowable range Sspan). If a negative decision is made, i.e., if it is decided that the compression size S exceeds (the upper limit to the allowable range Sspan), the compression processing unit 18 proceeds to step S19. If, on the other hand, the compression size satisfies a loose condition that it be equal to or smaller than (the upper limits to the allowable range Sspan) and thus an affirmative decision is made, the compression processing unit 18 judges that the desired image compression has been completed for the time being and ends the image compression processing in FIG. 3.

In step S19, the compression processing unit 18 makes a decision as to whether or not the number of compression trials has exceeded the limit. If an affirmative decision is made that the number of compression trials has exceeded the limit, the compression processing unit 18 discontinues the compression processing after obtaining the results of the most recent compression and ends the image compression processing in FIG. 3. If, on the other hand, the number of compression trials has not exceeded the limit and thus a negative decision is made, the compression processing unit 18 proceeds to step S20.

In step S20, the compression processing unit 18 multiplies the scale factor SF4 currently set by a predetermined factor (e.g., by a factor of 1.5) before returning to step S16.

To summarize the actions and advantages achieved in the embodiment described above, two types of reference quantization tables, i.e., the reference quantization tables corresponding to the ¼ compression and the reference quantization tables corresponding to the ⅛ and ¹⁄₁₆ compressions are provided in the electronic camera, and if the target compression rate is higher than ¼, i.e., if the target compression rate is ⅛ or ¹⁄₁₆, the DC component quantization step is reduced. As a result, if the AC component quantization step remains unchanged for the ¼ compression and the ⅛ and ¹⁄₁₆ compressions, the DC/AC quantization ratio becomes smaller at a higher compression rate, making it possible to prevent the occurrence of block noise due to an excessive expansion of the DC component quantization step with a high degree of reliability.

In addition, quantization tables are prepared by multiplying all the elements in the reference quantization tables, i.e., all the quantization steps including the DC component quantization step and the AC component quantization step by a scale factor. Thus, the DC/AC quantization ratio is sustained at a substantially constant value when adjusting the compression size through a scale factor adjustment to achieve a good balance in the compression distribution of the DC component/AC component regardless of whether the information volume in the image data is large or small.

Furthermore, since the compression size is adjusted through the adjustment of the scale factor alone, it is not necessary to implement complex processing for individually adjusting the DC component quantization step and the AC component quantization step. As a result, the compression size can be adjusted with ease and reliability.

In the explanation given above, once the target compression rate exceeds ⅛ (e.g., when the target compression rate is ¹⁄₁₆), the DC component reference quantization step is fixed by using the reference quantization tables in FIG. 5. Consequently, the risk of the AC component quantization step becoming expanded to an excessive degree or the risk of the DC component quantization step becoming too small is eliminated, making it possible to achieve a high quality compressed image at all times.

It is to be noted that while an explanation is given above by referring to specific examples of the reference quantization tables in FIGS. 4 and 5, the table values are not limited to the numerical values presented in the figures. Reference quantization tables should be obtained under normal circumstances by conducting a subjective evaluation test (an evaluation test of block noise, the compression distribution and the like) on the compressed image at each target compression rate and using the test results for reference.

INDUSTRIAL APPLICABILITY

While an explanation is given above in reference to an embodiment in which the present invention is adopted in an electronic camera, the image compression processing and the flowchart in FIGS. 2 and 3 may be provided as an image processing program which is stored in a recording medium. By executing this image processing program on a computer, actions and advantages similar to those realized in the embodiment described above can be achieved.

In addition, actions and advantages similar to those realized in the embodiment can be achieved by transmitting the image processing program to the computer via a communication line and executing the transmitted image processing program on the computer.

What is claimed is:

1. An electronic camera comprising:
    an image-capturing element that captures an image of a subject and outputs image data of the captured subject image;
    a compression processing unit that compresses the image data by converting the image data to a spatial frequency DC component and a spatial frequency AC component and by quantizing and coding the two components, wherein:
    said compression processing unit includes:
    a quantization ratio determining processing unit that determines a ratio of a DC component quantization step and an AC component quantization step (DC/AC quantization ratio) in correspondence to a target compression rate;
    a quantization adjustment processing unit that makes an adjustment on said DC component quantization step and said AC component quantization step while sustaining the DC/AC quantization ratio at a substantially constant value; and
    a compression rate control processing unit that controls said quantization adjustment processing unit so that a compression code volume resulting from the compression can be within a range according to a target compression rate.

2. An electronic camera according to claim 1, wherein:
    said quantization ratio determining processing unit adjusts the DC/AC quantization ratio to a smaller value as the target compression rate is set higher.

3. An electronic camera according to claim 1, wherein:
    said quantization ratio determining processing unit fixes the DC/AC quantization ratio at a constant value regardless of the target compression rate when the target compression rate is set higher than a predetermined value.

4. A computer-readable recording medium that stores an image processing program for compressing image data by quantizing and coding a DC component and an AC component, the image processing program comprising instructions to perform:
    DCT processing in which the image data are converted to a spatial frequency DC component and a spatial frequency AC component;
    quantization ratio determining processing in which a ratio of a DC component quantization step and an AC component quantization step (DC/AC quantization ratio) is determined in correspondence to a target compression rate;
    quantization adjustment processing in which said DC component quantization step and said AC quantization step are adjusted while sustaining the DC/AC quantization ratio at a substantially constant value; and
    compression rate control processing in which control is implemented on the quantization adjustment processing so that a compression code volume resulting from the compression can be within a range according to a target compression rate.

* * * * *